United States Patent [19]

Yamamoto et al.

[11] Patent Number: 5,587,768
[45] Date of Patent: Dec. 24, 1996

[54] PHOTOGRAPHIC PROJECTOR-PRINTER ASSEMBLY

[75] Inventors: Takashi Yamamoto; Yasunobu Sakaguchi; Makoto Utsugi, all of Kaisei-machi, Japan

[73] Assignee: Fuji Photo Film Co., Ltd., Kanagawa, Japan

[21] Appl. No.: 870,302

[22] Filed: Apr. 17, 1992

[30] Foreign Application Priority Data

Apr. 24, 1991 [JP] Japan .................. 3-094033

[51] Int. Cl.⁶ .................................. G03B 27/52
[52] U.S. Cl. .................................. 355/41
[58] Field of Search .................. 355/41, 44, 45, 355/46; 352/93; 359/638

[56] References Cited

U.S. PATENT DOCUMENTS

| | | | |
|---|---|---|---|
| 2,257,551 | 9/1941 | Griffin et al. | 352/93 |
| 3,333,053 | 7/1967 | Back | 359/638 |
| 3,848,996 | 11/1974 | Goding | 355/44 |

FOREIGN PATENT DOCUMENTS 160512  3/1921  United Kingdom .................. 359/638

*Primary Examiner*—David M. Gray
*Attorney, Agent, or Firm*—Sughrue, Mion, Zinn, Macpeak & Seas

[57] ABSTRACT

The present invention concerns a photographic projector-printer assembly for projecting a negative film F onto a photographic paper C through a projecting lens L for photographic printing, in which the projecting lens L is integrally provided on its object side with an optical path-splitting prism P for splitting on the optical axis the light for photometric and monitoring purposes, thereby eliminating such a printing ability reduction problem as is found in a system designed to put a reflecting mirror in and out and providing a solution to image distortion and measurement accuracy drop problems. In addition, the optical path-splitting prism P is designed to be adjustable in the optical axis direction and around the optical axis in terms of its position with respect to the projecting lens L, so that the optical axis of the assembly can be kept in alignment with that of an associated photometric and monitoring system.

7 Claims, 2 Drawing Sheets

PHOTOGRAPHIC PROJECTOR-PRINTER ASSEMBLY

BACKGROUND OF THE INVENTION

The present invention relates to a photographic projector-printer assembly and, more particularly, to a photographic projector-printer assembly which makes use of a projecting lens having on its object side an optical path-splitting prism as an integral piece.

As well known in the art, there is available a photographic projector-printer assembly in which a negative film held by a negative holder is projected onto a photographic paper through a projecting lens for photographic printing. So far, the measurement of the density distribution, etc. of the negative film by photometry is done by inserting a reflecting mirror in front of (or on the object side of) the projecting lens to guide the light from the negative film to a photometric element, and for printing it is removed out of the optical path. Alternatively, the photometric element is located off and above the optical path at a certain angle for photometric purposes.

However, problems with taking the reflecting mirror in and out of the optical path are that not only is much time needed but there is a drop of printing ability as well, and a problem with spacing the photometric element away from the optical path is that image distortion takes place as the image is seen obliquely, resulting in a drop of measurement accuracy.

Such problems may potentially be solved by locating an optical path-splitting means in front of the projecting lens, but this would give rise to some difficulty when the projecting lens is replaced by one having a different magnification.

SUMMARY OF THE INVENTION

In view of the above-mentioned situations, a primary object of this invention is to provide a photographic projector-printer assembly in which an optical path-splitting prism for guiding a part of the projecting light to a photometric system is mounted on the object side of a projecting lens as an integral piece, and a particular object of this invention is to make that optical path-splitting prism adjustable in terms of its optical path and direction.

According to this invention, the above and other objects are attained by providing a photographic projector-printer assembly for projecting a negative film onto a photographic paper through a projecting lens for photographic printing, in which a part of the light from the negative film can be used for photometry and monitoring an image on the negative film, characterized in that said projecting lens is integrally provided on its object side with an optical path-splitting prism for splitting the light for the photometry and monitoring purposes on the optical path.

Preferable for splitting and guiding the light to the associated photometric and monitoring system appropriately is that the projecting lens be movably mounted on the assembly body so as to achieve focus regulation in the optical axis direction and the optical path-splitting prism be adjustable in the optical axis direction and around the optical axis in terms of its position with respect to the projecting lens.

It is understood that the optical path-splitting prism may be moved in the opposite direction in operable association with the movement of the projecting lens; a double-helicoid mechanism may be used for moving the projecting lens; and a focal length-variable lens may be used as the projecting lens.

According to this invention wherein the optical path-splitting prism for splitting the light for photometric and monitoring purposes on the optical path is integrally provided with the projecting lens on its object side, any printing ability reduction problem does not arise, unlike the system designed to take the reflecting mirror in and out. Nor are there problems in connection with image distortion and a drop of measurement accuracy. In addition, there is no deviation of the optical axis of the present assembly from that of the photometric and monitoring system, even when the projecting lens is moved in the optical axis direction so as to regulate its focus. This is because the optical path-splitting prism is designed to be adjustable in the optical axis direction and around the optical axis in terms of its position with respect to the projecting lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the ensuing description, one preferred embodiment of the photographic projector-printer assembly according to this invention will explained specifically but not exclusively with reference to the drawings.

Figure 1:
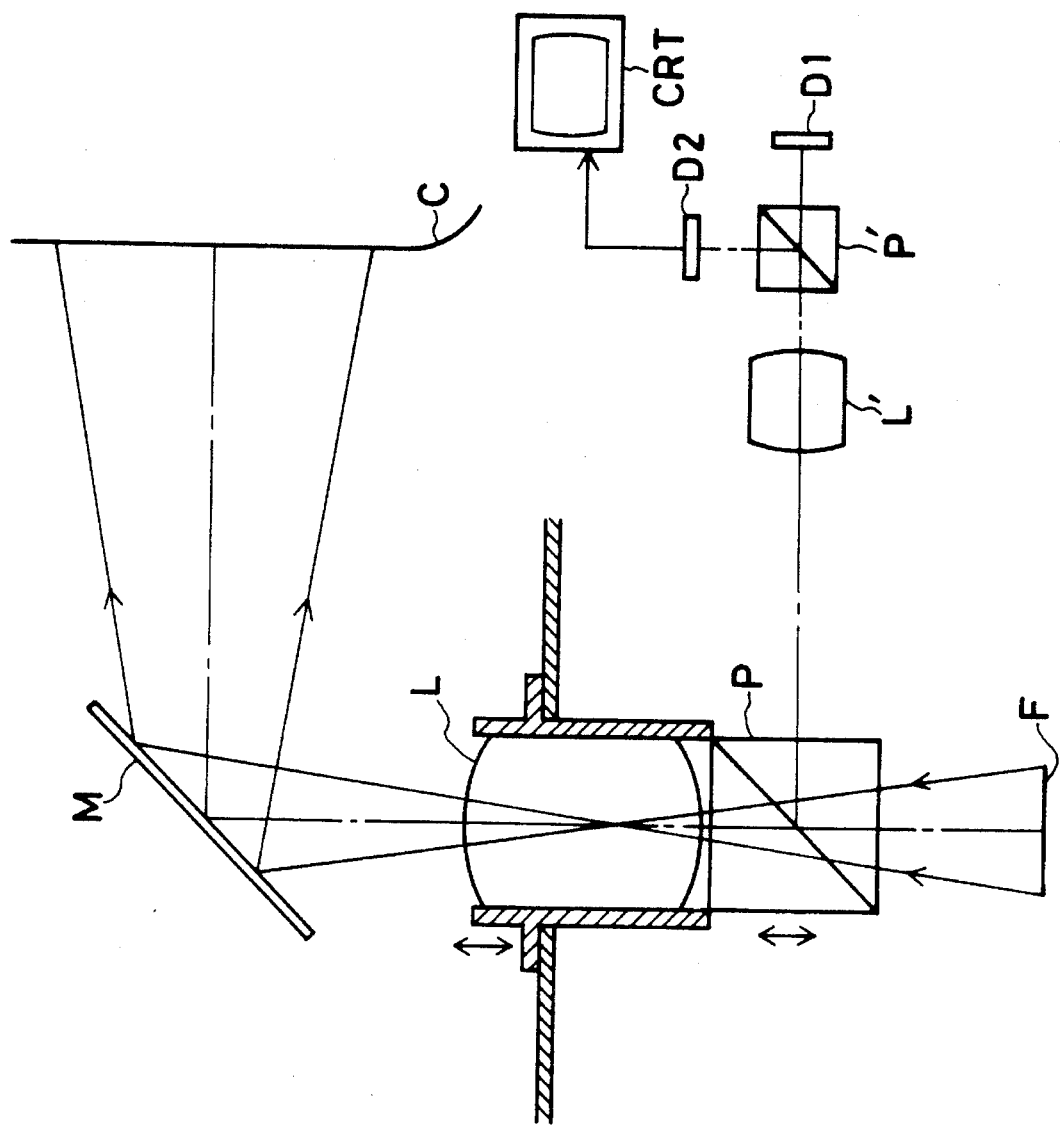
FIG. 1 represents the General structure of one embodiment of the photographic projector-printer assembly according to this invention.

As illustrated schematically in FIG. 1, the photographic projector-printer assembly according to this invention includes a projecting lens L for projecting an image on a negative film F onto a photographic paper C through a reflecting mirror M and an optical path-splitting prism P for splitting the light from the negative film F and guiding it to an associated photometric system, said prism P being located in front of and made integral with said projecting lens L. The light from the negative film F, which is split by the prism P, is guided to a photometric element D1 through a lens L', on the light-receiving surface of which the image on the negative film F is formed. Note that although not always needed, image formation is required to find the density distribution or the like of the negative film F or for spotted photometry. A part of that light is split by another optical path-splitting prism P' and then focused on the light-receiving surface of a monitoring image sensor D2. The image signal from the image sensor D2 is sent to a monitoring TV CRT, in which it is used for positioning or other purposes during printing.

It is noted that although the projecting lens L is adjustable in the optical direction, as shown by an arrow, so as to bring the image projected onto the photographic paper C into focus, the optical path-splitting prism P moves vertically depending upon where focus regulation takes place because, as already mentioned, it is located in front of and made integral with the projecting lens L. Also, this focus regulation may cause the prism P to vary in direction. In consequence, the optical axis of the assembly deviates from that of the photometric system, rendering proper photometry and monitoring impossible.

Figure 2:
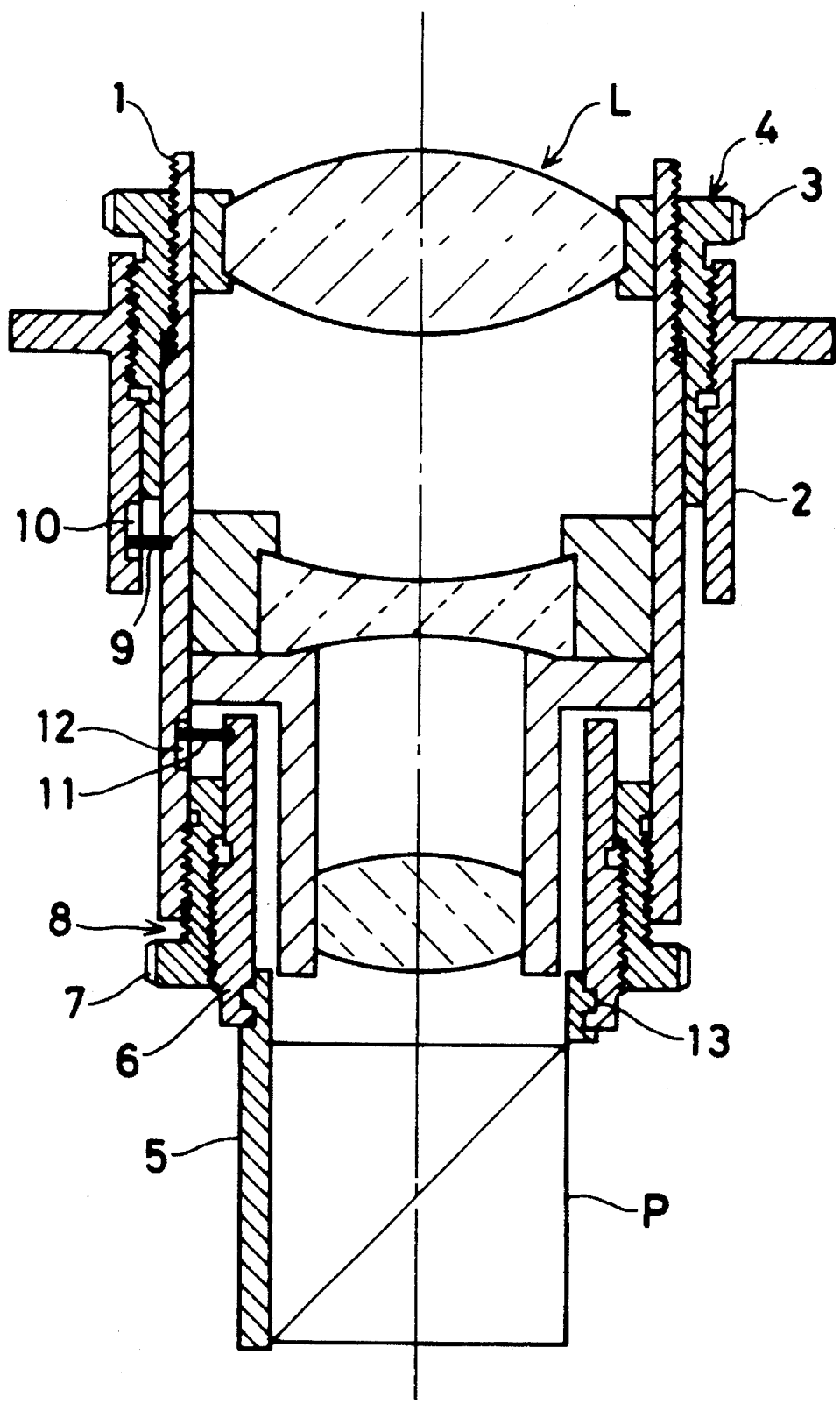
FIG. 2 is a sectional view, as viewed through the optical axis, showing the mounting regulating mechanism for the projecting lens and optical path-splitting prism of the assembly illustrated in FIG. 1.

According to this invention, therefore, the optical path-splitting prism P is designed to be adjustable in the optical axis direction and around the optical axis in terms of its position with respect to the barrel of the projecting lens. This will now be explained with reference to FIG. 2 that is a sectional view of the present assembly. The projecting lens L is fixed to a barrel 1, which is coaxially attached to a projecting lens mounting barrel 2 through a focus ring barrel 3. The barrel 1, focus ring barrel 3 and projecting lens mounting barrel 2 form together a double-helicoid mechanism 4, and between the inner barrel 1 and the outer projecting lens mounting barrel 2 there are provided a key 9 and a key groove 10 so as to allow them to move mutually in the optical axis direction alone while they are kept from rotating mutually around the optical axis. Thus, as the focus ring barrel 3 rotates around the optical axis, the projecting lens's barrel 1 moves in the optical axis direction with respect to the projecting lens mounting barrel 2 for focus regulation. On the other hand, the barrel 1 is coaxially provided at its lower end with an intermediate barrel 6 through a prism height regulating barrel 7. The barrel 1, prism height regulating barrel 7 and intermediate barrel 6 form together a double-helicoid mechanism 8, and between the outer barrel 1 and the inner intermediate barrel 6 there are provided a key 11 and a key groove 12 so as to allow them to move mutually in the optical axis direction alone while they are prevented from rotating mutually around the optical axis. Thus, as the prism height regulating barrel 7 rotates around the optical axis, the intermediate barrel 6 moves in the optical axis direction with respect to the barrel 1, so that the height of the intermediate barrel 6 can be regulated. The intermediate barrel 6 is provided with a prism holder frame 5 with the optical path-splitting prism P attached to it, in such a way that it can be rotated around the optical axis by a dovetail tenon 13 circumferentially provided in the inner face of its one end. Thus, as the prism height regulating barrel 7 is rotated, the optical axis position of the optical path-splitting prism P with respect to the barrel 1 of the projecting lens is regulated and as the prism holder frame 5 is rotated around the optical axis is for regulation, the direction of the exit axis of the optical path-splitting prism P is regulated.

The photographic projector-printer assembly according to this invention is constructed as mentioned above; that is, the regulation of the optical axis of the photometric system can be achieved by performing focus regulation by rotating the focus ring barrel 3, then regulating the vertical position of the optical path-splitting prism P by rotating the prism height regulating barrel 7 while monitoring the CRT, and finally adjusting the rotation of the prism holder frame 5 around the optical axis, thereby regulating the horizontal direction of the optical path-splitting prism P.

It is understood that while this invention has been described with reference to one specific, albeit not exclusive, embodiment, various modifications and changes may be made within the purport of this invention. For instance, the prism holder frame 5 may be moved in the opposite direction in mechanical association with the vertical movement of the barrel 1 based on focus regulation. In order to move the optical axis, various known mechanisms may be used in place of the double-helicoid mechanisms. Furthermore, a zoom lens rather than a focus-fixed lens may be used as the projecting lens L.

As can be apparent from what has been described above, the photographic projector-printer assembly of this invention, in which the optical path-splitting prism for splitting on the optical path the light for photometric and monitoring purposes is integrally attached to the projecting lens on its object side, is free from such a printing ability reduction problem as is found in the system adapted to take the reflecting mirror in and out. Nor are there image distortion and measurement accuracy drop problems. In addition, since the optical path-splitting prism is adjustable in the optical axis direction and around the optical axis in terms of its position with respect to the projecting lens, the optical axis of the assembly is kept in alignment with that of the photometric and monitoring system, even when the projecting lens is moved in the optical axis direction for its focus regulation.

What is claimed is:

1. A photographic projector-printer assembly for projecting a negative film onto a photographic paper through a projecting lens for photographic printing, in which a part of the light from the negative film can be used for photometry and monitoring an image on the negative film, wherein said projecting lens is provided on its object side, as an integral piece, with an optical path-splitting prism for splitting the light for the photometric and monitoring purposes on the optical path, wherein said projecting lens is movably mounted on the assembly body so as to achieve focus regulation in the optical axis direction and said optical path-splitting prism is adjustable in the optical axis direction and around the optical axis in terms of its position with respect to said projecting lens.

2. A photographic projector-printer assembly as claimed in claim 1, wherein said optical path-splitting prism is moved in the opposite direction in operable association with the movement of said projecting lens.

3. A photographic projector-printer assembly as claimed in claim 1 or 2, wherein a double-helicoid mechanism is used for moving the projecting lens.

4. A photographic projector-printer assembly as claimed in any one of claims 1–2 wherein a variable focal length lens is used as said projecting lens.

5. A photographic projector-printer assembly as claimed in claim 3, wherein a variable focal length lens is used as said projecting lens.

6. A photographic projector-printer assembly for projecting a negative film image onto a photographic paper through a projecting lens for photographic printing, in which a part of the light of the negative film image can be used for photometry and monitoring an image on the negative film, wherein said projecting lens is provided on its object side, as an integral piece, with an optical path-splitting prism for splitting the light for the photometric and monitoring purposes on the optical path, said projecting lens being movably mounted on the assembly body so as to achieve focus regulation in the optical axis direction and said optical path-splitting prism being adjustable in the optical axis direction and around the optical axis in terms of its position with respect to said projecting lens, said optical path-splitting prism being moved in the opposite direction in operable association with the movement of said projecting lens, and a double-helicoid mechanism for moving said projecting lens, said double-helicoid mechanism comprising an inner, first barrel fixed to said projecting lens, a focus ring barrel, an outer projecting lens mounting barrel coaxially attached to said first barrel through said focus ring barrel, means allowing the first barrel and the outer barrel to move mutually in the optical axis direction but preventing mutual rotation around the optical axis, so that as the focus ring barrel rotates around the optical axis, the first barrel moves in the optical axis direction with respect to the outer barrel for focus regulation, and at the lower end of said first barrel, an inner, intermediate barrel coaxially provided with said first barrel through a prism height regulating barrel, an optical path-splitting prism attached to said inner, intermediate barrel, means allowing the first barrel and the inner intermediate barrel to move mutually in the optical axis direction alone but preventing mutual rotation around the optical axis, so that as the prism height regulating barrel rotates around the optical axis, the intermediate barrel moves in the optical axis direction with respect to the first barrel, so that the height of the intermediate barrel can be regulated.

7. A photographic projector-printer assembly as claimed in claim 6, further comprising a prism holder frame fixed to said intermediate barrel, an optical path-splitting prism attached to said prism holder frame, means provided in the inner face of the intermediate barrel's one end, allowing rotation of said prism holder from around the optical axis, so that as the prism height regulating barrel is rotated, the optical axis position of the optical path-splitting prism is regulated, and as the prism holder frame is rotated around the optical axis, the direction of an exit axis of the optical path-splitting prism is regulated.

\* \* \* \* \*